United States Patent [19]

Crawley

[11] 4,346,828
[45] Aug. 31, 1982

[54] RAILROAD RAIL FRAGMENTING APPARATUS AND METHOD

[76] Inventor: Terrance V. Crawley, 30 Woodlawn Dr., Apt. A, Chattanooga, Tenn.

[21] Appl. No.: 138,974

[22] Filed: Apr. 10, 1980

[51] Int. Cl.³ .............................................. B26F 3/00
[52] U.S. Cl. ..................................... 225/2; 225/96.5; 225/103
[58] Field of Search ......................... 225/2, 96.5, 103; 83/417, 465

[56] References Cited

U.S. PATENT DOCUMENTS

| | | | |
|---|---|---|---|
| 344,735 | 6/1886 | Hill et al. | 225/103 X |
| 569,793 | 10/1896 | Miller et al. | 225/104 |
| 622,174 | 3/1899 | Ward et al. | 225/104 |
| 1,284,312 | 11/1918 | Glover | 225/103 |
| 1,477,582 | 12/1923 | Miller et al. | 225/104 |
| 2,334,940 | 11/1943 | LeTourneau | 225/103 |
| 3,370,494 | 2/1968 | Schenck | 83/417 X |
| 3,590,677 | 7/1971 | Smith | 83/465 X |
| 3,735,907 | 5/1973 | Kuchar et al. | 83/465 X |
| 3,802,629 | 4/1974 | Flanagan | 225/104 X |
| 3,904,097 | 9/1975 | Grambo, Jr. et al. | 225/103 |

FOREIGN PATENT DOCUMENTS

| | | | |
|---|---|---|---|
| 613862 | 7/1978 | U.S.S.R. | 225/96.5 |
| 622592 | 9/1978 | U.S.S.R. | 225/96.5 |

Primary Examiner—Frank T. Yost
Attorney, Agent, or Firm—Merriam, Marshall & Bicknell

[57] ABSTRACT

Apparatus for fragmenting or subdividing railroad rails wherein rails on tiltable platforms at the respective outer sides of two longitudinally extending, parallel sets of conveyors are lifted, one at a time, over fences on the platforms and onto the conveyors by rotatable fingers along the laterally inner edges of the platform. Inverted, shiftable T shaped hooks engage and right-tipped over rails on the conveyors prior to notching. Chisels on the ends of extensible and retractable plungers notch the outer edges of the base flanges of the rails. The notched rails advance toward holding and breaking stations and are held against upstanding, contoured walls by another set of plungers with one pair of the notches transversely aligned with breaking edges on the walls. A third set of plungers engage the portions of the rails that project unsupported beyond the breaking edges and bend these portions until separation occurs. A method of fragmenting or subdividing railroad rails is also disclosed, which includes the steps of transporting rails along longitudinally extending paths, righting tipped-over rails on the paths, substantially simultaneously inserting laterally oppositely arranged notches in the base flange of each rail, stopping the rails so that the sets of notches therein are aligned with breaking edges on upstanding, contoured walls along the inner sides of the paths, holding the rails against the contoured walls, and bending the unsupported portions of the rails until the unsupported portions break off.

14 Claims, 11 Drawing Figures

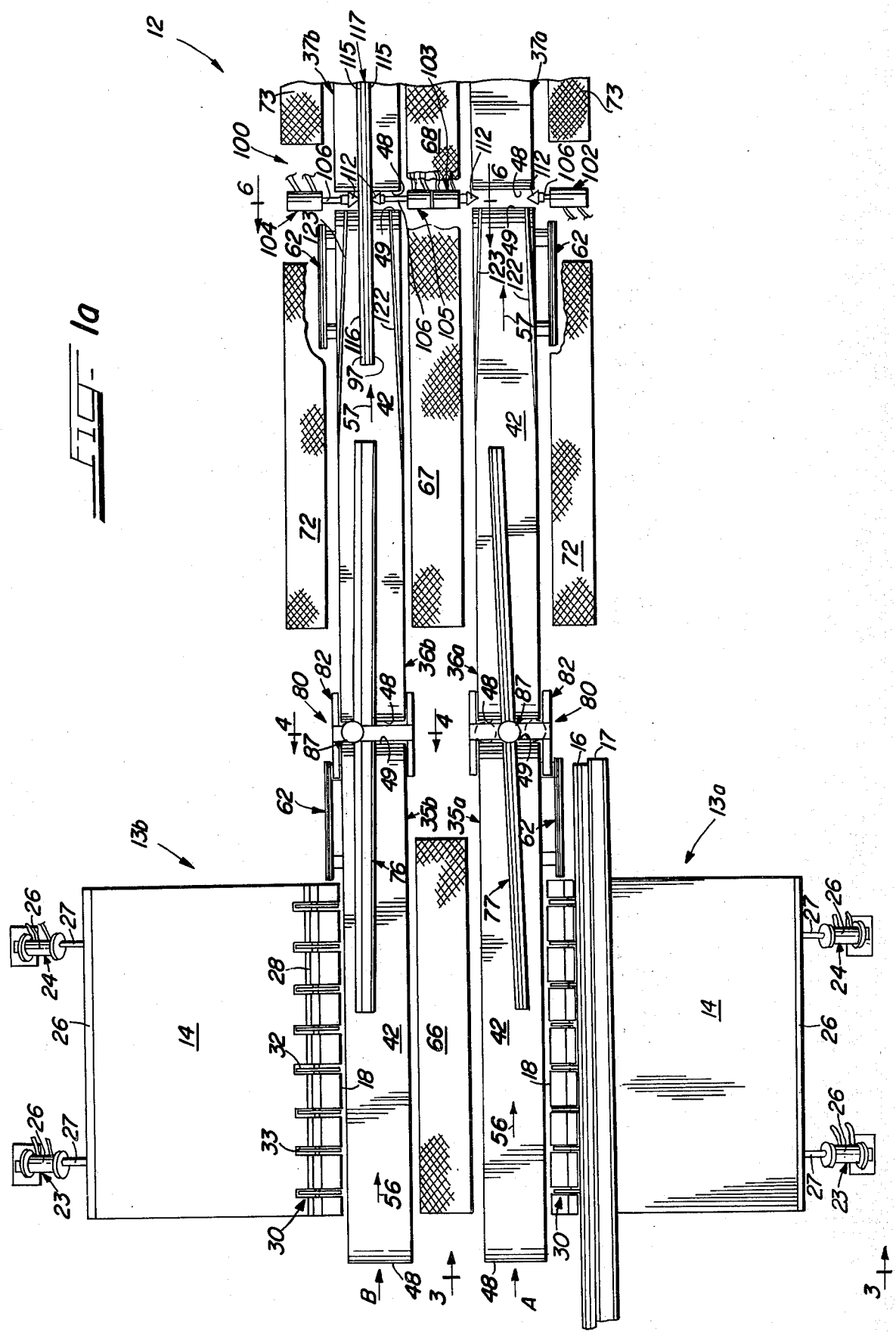

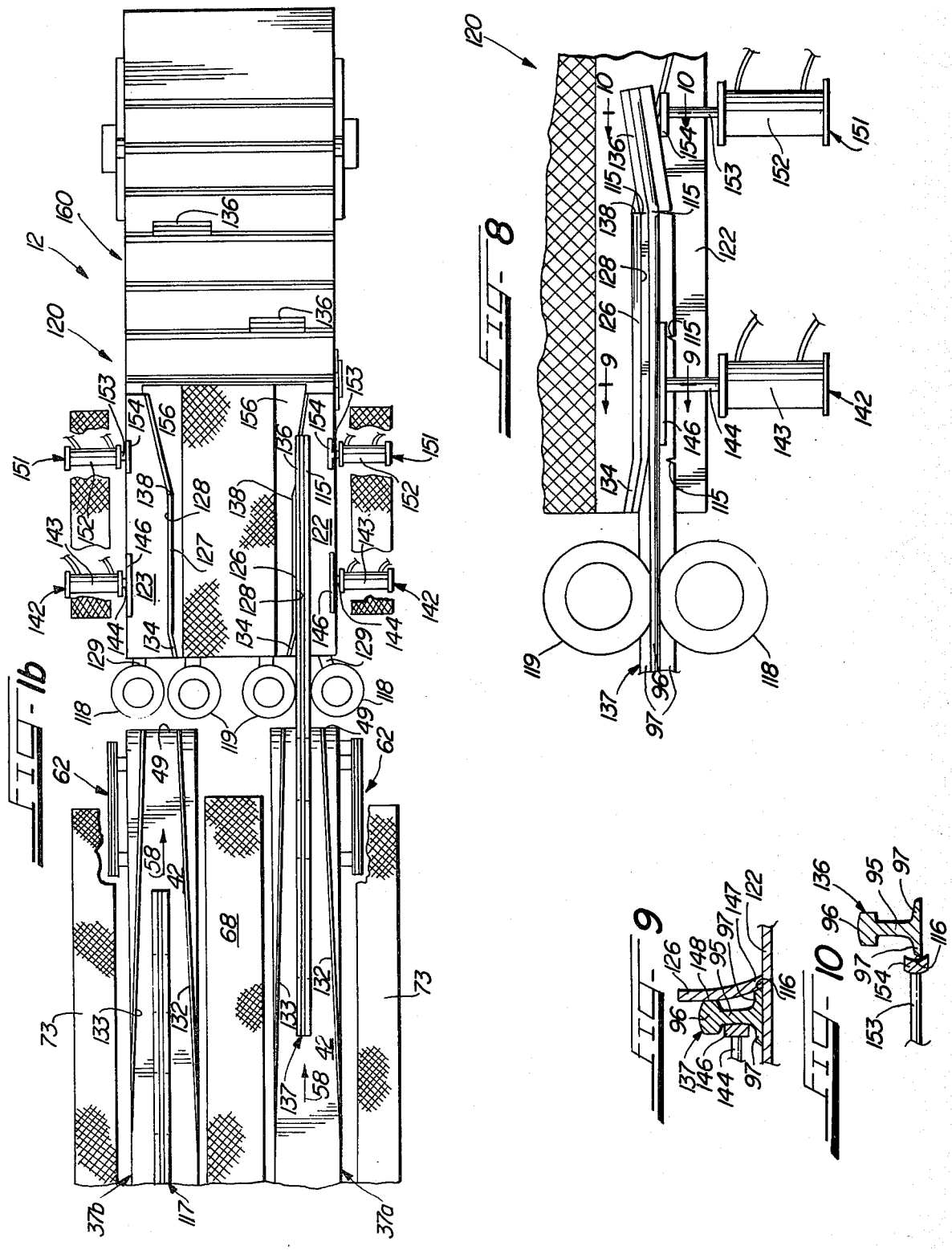

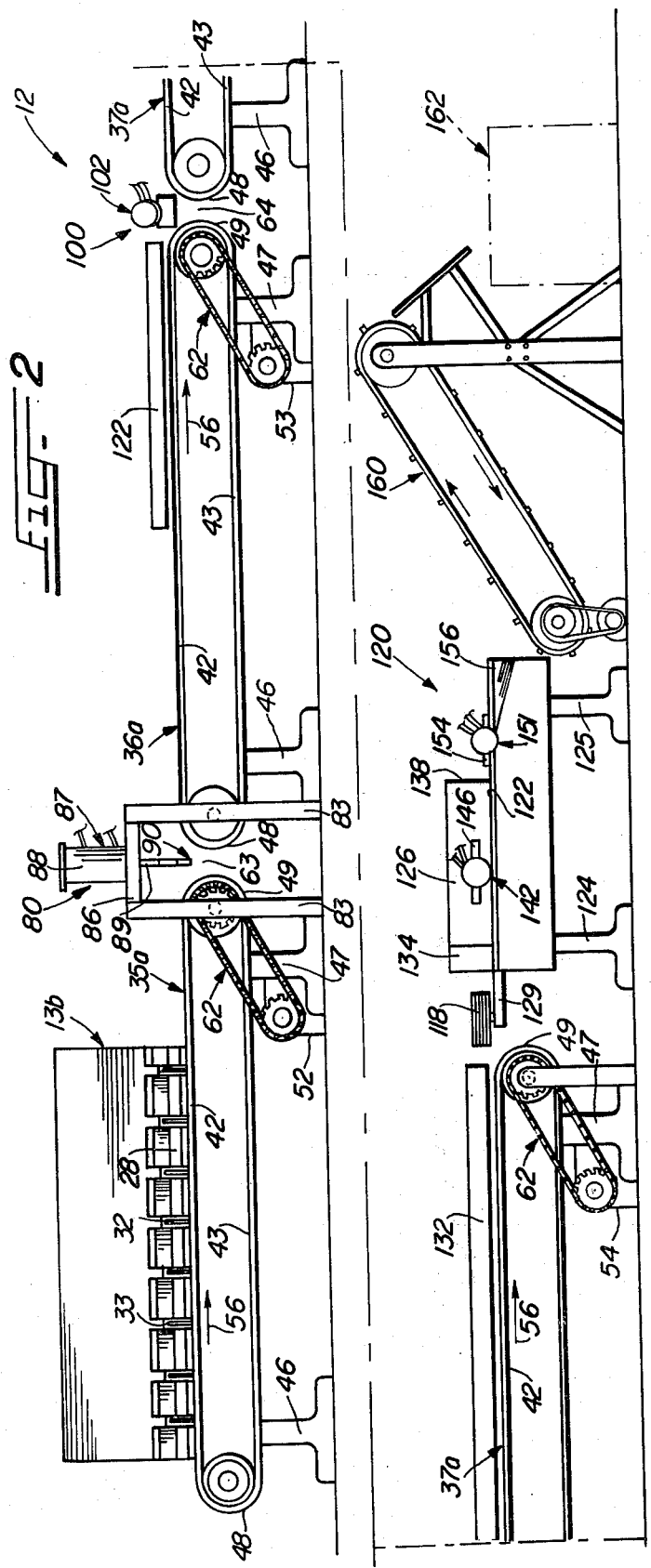

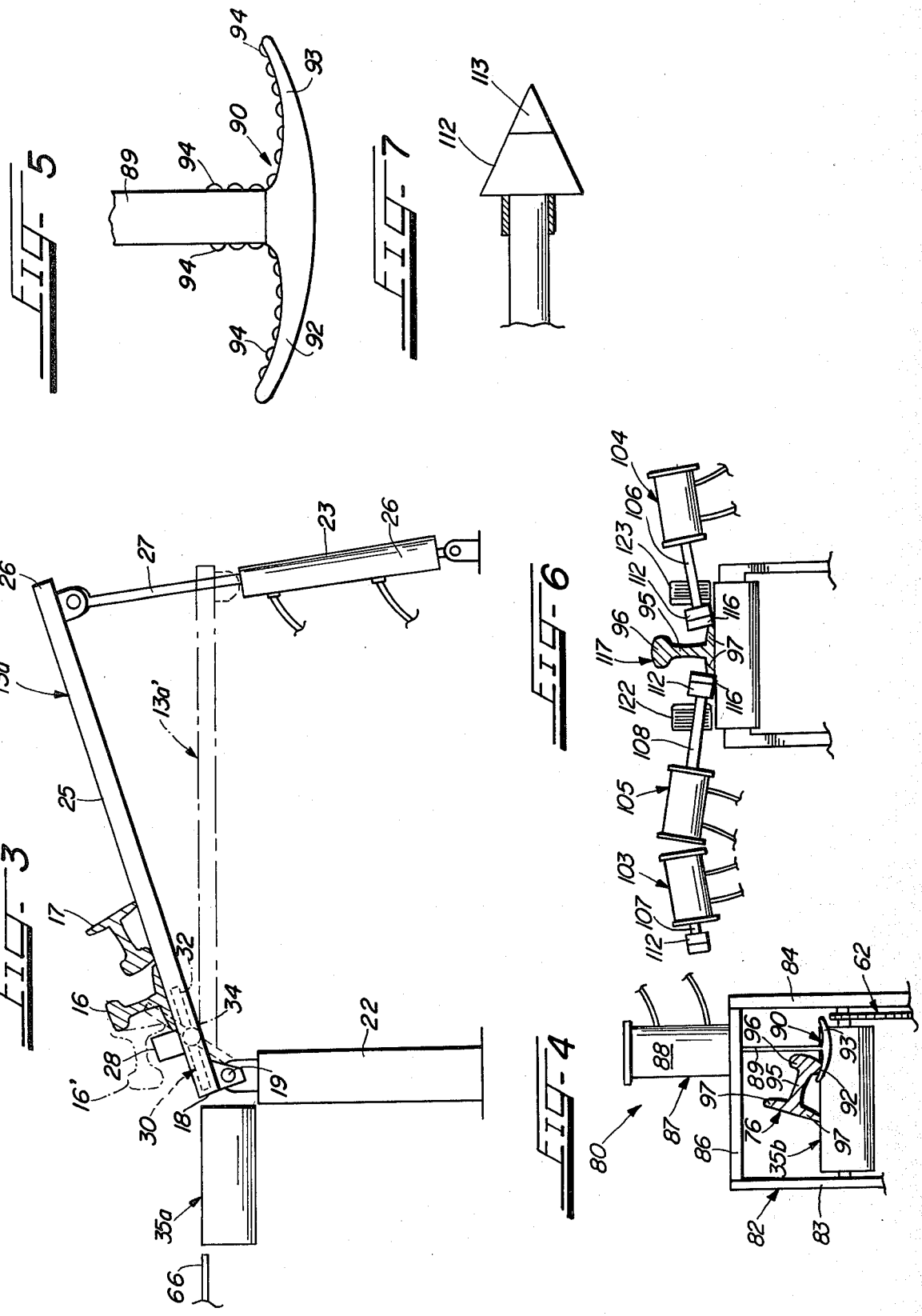

4,346,828

RAILROAD RAIL FRAGMENTING APPARATUS AND METHOD

BACKGROUND OF THE INVENTION

This invention relates to an apparatus and method for fragmenting or subdividing elongated articles, and more particularly relates to an apparatus and method for fragmenting or subdividing railroad rails.

As the rails of railroad tracks age and wear, it is desirable and/or becomes necessary from time to time to remove one or more rails, or complete sections of track, and replace the removed rails with new rails. Also, when portions of a railroad line are abandoned or otherwise fall into disuse, sections of the track are frequently removed by salvagers and sold to steel mills or other metal processing facilities requiring scrap metal. Since the rails as removed from the railroad beds are too long for convenient handling and processing, it is desirable to fragment or otherwise divide the rails into small pieces for ease of shipment and subsequent metallurgical operations.

While machines are available for fragmenting or subdividing elongated lengths of material into smaller pieces, and while machines have specifically been developed for fragmenting or subdividing railroad rails into smaller pieces, so far as it is known, no machines are presently available which are capable of rapidly, efficiently and economically fragmenting or subdividing railroad rails such as to make the salvaging thereof worthwhile.

Accordingly, it is a general object of the present invention to provide a novel apparatus and method for rapidly, efficiently and economically fragmenting elongated lengths of metal into smaller pieces to facilitate further processing and/or reuse of the metal fragments.

Another object is to provide a novel apparatus for rapidly, efficiently and economically fragmenting railroad rails into short lengths suitable for use as scrap or in other metallurgical processes.

These and other objects will become apparent from the subsequent detailed description and accompanying drawings.

BRIEF SUMMARY OF THE INVENTION

Briefly described, in one of its aspects, the present invention contemplates a novel apparatus for fragmenting or subdividing railroad rails into smaller pieces suitable for use as scrap or in other metallurgical processes. Such apparatus includes a tiltable platform at one side of a first conveyor for receiving a plurality of rails to be fragmented, and transferring means, including a plurality of lifting members or fingers, are mounted on a rotatable shaft which extends along the edge of the platform adjacent to the first conveyor. The fingers lift rails, one at a time, over a fence, which extends along the edge of the platform adjacent to the first conveyor, and onto the first conveyor.

Righting means in the form of a generally inverted, T-shaped hook member is provided for engaging the head of a rail being transported lengthwise on the first conveyor and righting the rail so that it rests on its base prior to being notched. The hook is carried by a support structure which spans a gap between the first conveyor and a second conveyor that is longitudinally aligned with and spaced from the first conveyor. The arms of the hook are provided with anti-friction bearings to permit a rail to move relative to the hook while being transported on the first and second conveyors.

Notching means in the form of a pair of chisel members or heads are mounted on the ends of a pair of extensible and retractable, hydraulically actuated plungers. The chisel members substantially simultaneously insert a pair of notches in the outer edges of the base flanges of the rail.

Converging guide members on a third conveyor, which is longitudinally aligned with the second conveyor, guide the leading end of the notched rail between a pair of rotatable members at the upstream end of a holding and breaking station. The holding and breaking station includes an extensible and retractable plunger which engages and holds the rail against an upstanding, longitudinally extending wall in the holding and breaking station with a pair of notches in the rail in substantial transverse alignment with a downstream breaking edge of the wall. Another extensible and retractable plunger in the holding and breaking station engages the portion of the rail that projects beyond the upstanding wall and bends the rail until separation occurs at the transversely aligned notches.

After separation, the fragments of the rails are conveyed to a storage area for subsequent transport to a scrap metal processor or the like.

In another aspect of the invention, a novel method of fragmenting or subdividing railroad rails into smaller pieces is contemplated which includes the steps of substantially simultaneously notching the base flanges of a rail, holding a portion of the rail at one side of the notches, and bending an unsupported portion of the rail on the opposite of the notches until the unsupported portion breaks off. The method also contemplates the steps of transferring the rails, one at a time, from a self-feeding storage platform onto a conveyor so that the notching, holding and bending steps can be performed sequentially while the rail is being transported on a longitudinally extending path, and righting the rail so that it is resting on its base flanges prior to notching.

DESCRIPTION OF THE VIEWS OF THE DRAWINGS

FIGS. 1a and 1b are connecting top plan views of different portions of a railroad rail fragmenting apparatus embodying the features of the present invention;

FIG. 2 is a separated side elevational view of the railroad rail fragmenting apparatus illustrated in FIGS. 1a and 1b;

FIG. 3 is an enlarged end elevational view of one of the rail loading platforms employed in the railroad rail fragmenting apparatus illustrated in FIGS. 1a and 1b;

FIG. 4 is an enlarged transverse sectional view taken substantially along the line 4—4 of FIG. 1a;

FIG. 5 is an enlarged, side elevational view of one of the righting hooks utilized in the apparatus of the present invention;

FIG. 6 is a transverse sectional view, with some parts in elevation, taken substantially along the line 6—6 of FIG. 1a;

FIG. 7 is an enlarged, top plan view of one of the notching heads of the apparatus;

FIG. 8 is an enlarged, fragmentary top plan view of a portion of the rail holding and breaking station of the portion of the apparatus illustrated in FIG. 1b and showing the positions that the rail holding and breaking plungers would occupy when engaged with a rail during a breaking operation;

FIG. 9 is a fragmentary sectional view taken along the line 9—9 of FIG. 8; and

FIG. 10 is a fragmentary sectional view taken along the line 10—10 of FIG. 8.

DETAILED DESCRIPTION

Referring initially to FIGS. 1a, 1b and 2, a railroad rail fragmenting or subdividing apparatus embodying the features of the present invention is illustrated and indicated generally at 12. The construction of the apparatus 12 is such that rails can be processed while advancing along two parallel, longitudinal paths, such paths being indicated by arrows in FIG. 1a and identified by the letters A and B. The structure of the apparatus 12 on each of the paths A and B is substantially identical. Consequently, like reference numerals have been used to identify identical parts. However, when the apparatus 12 is in operation, the components for processing the rails on the paths A and B do not necessarily function at the same time. In this regard, rails are shown in different positions on the respective paths A and B, and the components of the apparatus along the respective paths have likewise been shown in different positions for clarity of presentation and a better understanding of the invention.

Referring initially to FIGS. 1a and 2, it will be seen that a pair of loading platforms 13a and 13b are provided adjacent the laterally outer sides of the respective paths A and B. The platforms 13a and 13b are adapted to receive and support a plurality of elongated members to be fragmented, specifically railroad rails, on the upper surfaces thereof, indicated at 14. Two rails are illustrated in FIGS. 1a and 3 and indicated at 16 and 17, respectively.

The laterally inner edge portions, indicated at 18, of the platforms 13a and 13b are pivotally connected as at 19 (FIG. 3) to the upper ends of an upright support 22. Elevating means in the form of a pair of longitudinally spaced pivotally mounted plunger and cylinder assemblies 23 and 24 are connected to the laterally outer edge portions, indicated at 26, of each platform for raising and lowering the platforms between upwardly inclined operative positions illustrated in full lines in FIGS. 1a and 3 and inoperative, horizontal, loading positions, illustrated in broken lines in FIG. 3 and indicated at 13a'. Thus, when fluid under pressure is supplied to the cylinders, indicated at 26, of the plunger and cylinder assemblies 23 and 24, the plungers thereof, indicated at 27, extend and raise the platforms 13a and 13b to their operative, inclined positions illustrated in full lines in FIGS. 1a and 3. When elevated, any rails resting on the platforms 13a and 13b will slide toward the conveyors 35a and 35b, such sliding movement being blocked by abutments or fences 28, which extend lengthwise of the platforms adjacent to the laterally inner edge portions 18 thereof.

In order to transfer rails on the platforms 13a and 13b onto the paths A and B, transferring means, indicated generally at 30, is provided along the laterally inner edge portions 18 of each platform for lifting a rail over the fence 28 and onto the path. Such transferring means, in the present instance, comprises a plurality of laterally extending, longitudinally spaced lifting members or fingers 32, which are respectively positioned in a plurality of longitudinally spaced slots 33 that extend laterally outwardly from the inner edges 18 of the platforms and through and beyond the fences 28. Each set of bars 32 is centrally mounted on a rotatable shaft 34, which underlies the fence 28 and which extends longitudinally of the associated platform and the path on which the rail is to be transferred. The shafts 34 are respectively supported in bearings (not shown) in the platforms 13a and 13b, and drive means (also not shown) are connected to the shafts 34 for effecting rotation thereof in a direction to lift a rail over the fence 28. Thus, when the shafts 34 are rotated, the fingers 32 will engage a rail, such as a rail 16, close to the fence 28 and lift the same over the fence and onto the path adjacent to the platform. The position of the rail 16 while being lifted over the fence 28 is illustrated in phantom lines in FIG. 3 and indicated at 16'. Rotation of the shafts 34 to lift a rail, one at a time, from the platform 13a or 13b onto the path A or the path B may be either manually controlled by an operator or automatically by an appropriate control system (not shown).

As previously mentioned, rails to be fragmented by the apparatus 12 are transported one at a time in substantial end-to-end relation along the two parallel paths A and B. Each of said paths, in the present instance, is defined by conveyor means comprising first, second and third conveyors arranged in longitudinally aligned, end-to-end relation. Thus, the first, second and third conveyors of the path A are indicated at 35a, 36a and 37a, respectively, and the first, second and third conveyors of the path B are indicated at 35b, 36b and 37b, respectively. As best seen in FIG. 2, the conveyors 35a–37a and 35b–37b each include upper and lower runs, indicated at 42 and 43, respectively, and are supported in an elevated position by suitable support members, indicated at 46 and 47 adjacent the respective upstream and downstream ends, indicated at 48 and 49, of the conveyors.

Drive means, such as electric motors, indicated at 52, 53 and 54 may be used to drive the conveyors 35a–37a, and a similar set of electric motors (not shown) may be used to drive the conveyors 35b–37b so that the upper runs 42 thereof move in the direction of the arrows 56, illustrated in FIG. 2. Power from the motors 52, 53 and 54 may be transmitted to the conveyors by a sprocket and chain drive, indicated generally at 62 in FIGS. 1a, 1b and 2.

As best seen in FIGS. 1a and 1b, the downstream ends 49 of the conveyors 35a and 35b are separated from the upstream ends 48 of the conveyors 36a and 36b, and the downstream ends 49 of the conveyors 36a and 36b are separated from the upstream ends 48 of the conveyors 37a and 37b to define gaps 63 and 64 (FIG. 2) therebetween, respectively. In addition, the conveyors 35a–37a and 35b–37b are laterally separated from each other to permit catwalks, indicated at 66, 67 and 68 to be positioned therebetween. Additional catwalks, indicated at 72 and 73 may be provided on the laterally outer sides of the conveyors 36a,36b and 37a,37b, respectively.

Assuming that a rail, indicated at 76, comes to rest on the conveyor 35b in a tipped over position after having been lifted over the fence 28. To correct this condition, the apparatus 12 includes righting means, indicated generally at 80, for engaging the rail and shifting it to an upright position, as illustrated by the position of the rail 77 on the conveyors 35a and 36a. An identical righting means 80 is provided for righting rails on the path A. Consequently, only the righting means 80 associated with the path B will be described in detail.

Referring now to FIGS. 2, 4 and 5 in conjunction with FIG. 1a, it will be seen that the righting means 80 includes a support structure or frame 82, which may include two longitudinally spaced pairs of upright members or posts 83 and 84 adjacent the downstream ends 49 and upstream ends 48 of the conveyors 35b and 36b, respectively, and a connecting cross member 86, which spans the conveyors and generally overlies the gap 63 therebetween.

Each righting means 80 also includes an extensible and retractable plunger and cylinder assembly, indicated generally at 87, which is mounted for translating movement on the cross member 86 of the support frame 82. The cylinder 88 of the assembly 87 extends above the cross member 86 and the extensible and retractable plunger thereof, indicated at 89, extends below the cross member 86 and is of sufficient length to extend below the upper runs 42 of the conveyors 35b and 36b. The lower end of the plunger 89 terminates in a hook member, indicated generally at 90, which includes a pair of laterally outwardly extending arms 92 and 93. The arms 92 and 93 of the hook member 90 extend transversely of the conveyors 35b and 36b and are thus shiftable in the gap 63.

As illustrated in FIG. 5, anti-friction means in the form of a plurality of ball bearings or rollers 94 are mounted on the upper surfaces of the arms 92 and 93 and also on the side portions of the lower end of the plunger 89. The ball bearings 94 thus reduce friction between the hook member 90 and a rail when the hook member is engaged therewith, as illustrated in FIG. 4, and the conveyor is in motion. Thus, the hook member 90 can perform its righting function on a tipped over rail, such as the rail 76 illustrated in FIGS. 1a and 4, while the rail is being transported on the conveyors 35b and 36b.

Righting of a tipped over rail, such as the rail 76, is thus effected by shifting the plunger and cylinder assembly 87 laterally on the cross member 86 of its support 82 a sufficient distance to permit one of the arms, such as the arm 92, of the hook 90 to be shifted to a position underlying the head, indicated at 96, of the rail 76. Thereafter, the plunger 89 is retracted into the cylinder 88, thereby causing the arm 92 to engage the underside of the head 96 of the rail and tip the latter to its normal, upright position resting on the base flanges 97 thereof, as illustrated by the position of the rail 77 on the conveyors 35a and 36a. The web of the rail 76, which connects the head 96 with the base flanges 97, is indicated at 95. After righting, the hook 90 remains in an elevated, retracted position in readiness for another righting operation in the event that another rail comes to rest in a tipped over position on the conveyor 35b.

Assuming that any tipped over rails on either of the paths A and B are righted by the righting means 80 associated with these paths, the rails on the paths A and B are conveyed to a notching station, indicated generally at 100 disposed in the gaps 64 between the conveyors 36a,37a and 36b,37b.

Referring now to FIG. 6 in conjunction with FIG. 1a, it will be seen that the notching station 100 includes a pair of laterally spaced plunger and cylinder assemblies 102,103 disposed on the laterally opposite sides of the conveyors 36a,37a, and a pair of laterally spaced plunger and cylinder assembly 104,105 disposed on the laterally opposite sides of the conveyors 36b,37b. The plunger and cylinder assemblies 102,103,104 and 105 have extensible and retractable plungers 106. The plunger and cylinder assemblies 102 and 104 are supported by structure (not shown) adjacent the laterally outer sides of the conveyors 36a,37a and 36b,37b by suitable support structure (not shown). The plunger and cylinder assemblies 103,105 are likewise supported between the conveyors 36a,37a and 36b,37b by suitable support structure (also not shown).

Chisel members in the form of triangularly-shaped heads 112 having hardened tips 113, are mounted on the outer ends of the plungers 106 for substantially simultaneously inserting laterally oppositely arranged notches, indicated at 115 in FIGS. 1a and 6, in the outer edges, indicated at 116, of the base flanges 97 of rails on the paths A and B in the notching station 100. In FIGS. 1a and 6, the chisel members 112 of the plunger and cylinder assemblies 104 and 105 are shown inserting a pair of notches 115 in the outer edges 116 of a rail 117 on the conveyors 36b and 37b. Lateral centering of rails being transported on the conveyors 36a and 36b, before the rails enter the notching station 100, is facilitated by converging guide fences 122 and 123 disposed above the upper runs 42 of the conveyors 36a and 36b.

According to the present invention, the directions of movement of the plungers 106 of the plunger and cylinder assemblies 102 and 103, and 104, and hence the direction of movement of the chisel-tipped heads 112, are preferably inclined above the horizontal by an angle of about 10 degrees. In this regard, while it is preferable to insert laterally oppositely arranged notches in the outer edges 116 of the base flanges 97 of a rail, under certain circumstances, such notches might be placed at some other location in the rail. In addition, notches could also be inserted at other locations in the rail, such as in the head 96 or in the connecting web 95.

Movement of rails on the paths A and B through the notching station 100 may be manually or automatically controlled by an appropriate control system (not shown), such as electric eyes or linear measuring devices which sense the amount of movement of the rail and effect stoppage of the conveyors long enough for fluid under pressure to be applied to the notching cylinders 102, 104 and 103,105. In this regard, it is contemplated that the longitudinal spacing between the respective pairs of notches will be variable from between about 18 inches to 30 inches.

Shortly after the last set of notches 115 have been inserted into the flanges of a rail, the leading end thereof will pass between a pair of laterally spaced, rotatable, guide members 118 and 119 for each of the paths A and B and located at the entrance of a combined rail holding and breaking station 120 for each of the paths. The leading ends of rails moving on the upper runs 42 of the conveyors 37a and 37b are guided toward centered positions on the conveyors by converging fences, indicated at 132 and 133 in FIG. 1b and 2, which also guide the leading ends of the rails between the respective pairs of rotatable guide members 118 and 119.

The holding and breaking station 120 includes a pair of longitudinally extending, horizontal support surfaces 122 and 123 forming parts of the paths A and B, respectively. The support surfaces 122 and 123 are supported by suitable support members or frames 124 and 125 (FIG. 2) so that the support surfaces 122 and 123 are at substantially the same level as the upper runs 42 of the conveyors 37a and 37b. A pair of longitudinally extending, upstanding walls 126 and 127 are provided on the support surfaces 122 and 123, the laterally outer surfaces, indicated at 128, of the walls 126 and 127 serving as guides for the portions of rails in the holding and breaking station 120. In this regard, the laterally inner rotatable guide members 119 of each pair are fixed against transverse movement and the laterally outer, rotatable guide members 118 of each pair are capable of lateral movement, relative to the guide members 119. To this end, the guide members 118 may be mounted on swingable arms 129, which are biased by springs (not shown) toward the guide members 119. While various types of rotatable guide members could be employed at the entrance of the holding and breaking station 120, the guide members 118 and 119 are preferably pneumatic tires mounted for rotation about laterally spaced, vertical axes.

Thus, when rails are resting on the support surfaces 122 and 123 of the holding and breaking station 120, they are supported and restrained against the laterally inward movement by the fixed, rotatable guide members 119 and the outer surfaces indicated at 128, of the walls 126 and 127.

The upstream ends, indicated at 134, of the walls 126 may be laterally inwardly inclined, as illustrated in FIG. 1b, to facilitate guiding of the leading ends of rails into proper position in the holding and breaking station 120. When properly positioned in the holding and breaking station 120 for a breaking operation, the portion of the rail to be fragmented, such as the portion 136 of the rail 137 illustrated in FIG. 1b, is longitudinally positioned on the support surface 122 so that the notches 115 in the base flanges of the rail 137 are in transverse alignment with the downstream end, indicated at 138, of the wall 126. The end 138 thus forms a breaking edge for the portion 136 of the rail which projects therebeyond. The wall 127 likewise includes a breaking edge 138, in the same location as the breaking edges 138 of the wall 126.

In order to support at least a portion of the rail in the holding and breaking station 120 so that the portion projecting beyond the breaking edge 138 may be broken off, holding means in the form of a pair of laterally spaced, plunger and cylinder assemblies 142 is provided for each of the paths A and B. Each plunger and cylinder assembly 142 thus includes a cylinder 143 and an extensible and retractable plunger 144 having an elongated pad 146 adapted to engage the web 95 of a rail, such as the rail 137 illustrated in FIGS. 1b and 8, and forcefully shifting the rail into engagement with the outer surface 128 of the wall 126. Extension and retraction of the plungers 144 of the plunger and cylinder assemblies 142, which comprise shiftable means for shifting rails into engagement with the walls 126 and 127, is effected by the application of hydraulic pressure to opposite sides of pistons (not shown) in the cylinders 143 of the assemblies from an appropriate source thereof (also not shown).

In order to prevent tilting of rails when engaged by the pads 146 of the plunger and cylinder assemblies 142, the lower portion, indicated at 147, of the wall 126, and likewise the wall 127, is undercut so that the adjacent side edge, indicated at 148, of the head 96 of the rail, and the outer edge 116 of the base flange 97 adjacent to the wall concurrently engage the wall 126. Such relationship is illustrated in FIG. 9.

After the portions of the rails upstream from the pair of notches 115 at which the rails are to be broken have been rigidly shifted into engagement with the walls 126 and 127 by the plunger and cylinder assemblies 142, the projecting portions 136 of the rails are broken off by actuating laterally spaced pair of plunger and cylinder assemblies, each indicated at 151 in FIGS. 1b and 8. The assemblies 151 are spaced downstream from the breaking edges 138 of the walls 126 and 127 and include cylinders 152 for extending and retracting plungers 153. The plungers 153 have concave pads 154 secured to the outer ends thereof for engaging and embracing the adjacent outer edges 116 of the base flanges 97 of the portions 136 of the rails to be broken off, as illustrated in FIG. 10. Fragmentation of the portions 136 of the rails takes place when the portions 136 have been bent sufficiently to cause a fracture to develop at the notches 115 and extend across the rail.

After the portions 136 break off, they fall into a chute 156 at the downstream end of the holding and breaking station 120 and are thence carried onto another conveyor, indicated generally at 160, which serves to transport the rail fragments into a suitable storage area or container, indicated in phantom lines at 162 in FIG. 2.

Fragmentation of rails on the paths A and B of the apparatus 12 continues by advancing the rails in increments equal to the spacing between the aligned pairs of notches 115 until the rails are completely fragmented. At that time, another set of rails will be in position for advancing into the holding and breaking station 120.

OPERATION OF THE APPARATUS 12

The operation of the apparatus 12 may be summarized as follows:

Assuming that the loading platforms 13a and 13b (FIGS. 1a and 2) at each side of the first laterally spaced pair of longitudinally extending conveyors 35a and 35b of the parallel paths A and B of the apparatus have been loaded with rails, fluid under pressure is supplied to the cylinders 26 of the plunger and cylinder assemblies 23 and 24 to raise the platforms 13a and 13b to positions inclined toward the conveyors. The rails are thus caused to slide toward the conveyors 35a and 35b and into contact with fences 28 along the laterally inner edges 18 of the platforms.

Rails are transferred, one at a time, from the platforms 13a and 13b onto the conveyors 35a and 35b by effecting rotation of shafts 34 (FIG. 3) mounted in or below the platforms 13a and 13b so as to cause laterally extending fingers 32, which are mounted on the shafts 34, to lift the rails over the fences 28 and onto the conveyors 35a and 35b. Additional rails on the platforms 13a and 13b thus slide downwardly on the platforms by gravity until needed.

As the rails are transported on the conveyors 35a and 35b any tipped over rails are righted by hooks 90 (FIGS. 1a, 2, 4 and 5), which are secured to the lower ends of extensible and retractable plungers 89. The plungers 89 are part of a laterally spaced pair of plunger and cylinder assemblies 87 which are respectively mounted for lateral movement on support structures 82 overlying gaps 63 (FIG. 2) between the first and second conveyors 35a and 36a of the path A and the first and second conveyors 35b and 36b of the path B.

Upright rails on the conveyors 36a and 36b and pass through a notching station 100 (FIGS. 1a, 2 and 6), which includes laterally aligned plunger and cylinder assemblies 102,103 and 104,105 for notching rails on the paths A and B, respectively. Chisels 112 on the outer ends of the extensible and retractable plungers 106 of the assemblies 102,104 and 103,105 engage the side edges 116 (FIG. 6) of the base flanges of rails in the station 100 and substantially simultaneously insert a pair of laterally aligned notches 115 in the base flanges 97 of the rails. The rails are advanced in increments through the notching station 100 until the base flanges 97 are completely notched.

Shortly after the last set of notches 115 is placed in the flanges 97 of the rails on the paths A and B, the leading ends of the rails pass between the treads of a pair of rotatable guide members 118 and 119 for each path. The guide members 118 and 119, which comprise pneumatic tires, serve to guide the rails on the paths A and B into a holding and breaking station 120.

The rails are advanced over horizontal support surfaces 122 and 123 in the holding and breaking station for the paths A and B, to positions wherein the portions 136 of the rails to be broken off project beyond breaking edges 138 of upstanding walls 126 and 127 on each of the support portions 122 and 123. The laterally aligned notches 115 in the base flanges of the rail are in transverse alignment with the breaking edges 138 at this time. The rails are held in position in the holding and breaking station 120 by pads 146 on the outer ends of plungers 144 of laterally spaced plunger and cylinder assemblies 142 when fluid under pressure is applied to the cylinders 143 of the assemblies. The pads 146 engage the webs 95 of the rails (FIG. 9) and the lower portions 147 of the walls 126 are undercut so that the outer edges of the base flanges 97 adjacent to the walls 126 and 127, and the side edges of the heads 96 of the rails, concurrently contact the walls when forced thereagainst by the plunger and cylinder assemblies 142.

Fragmenting or subdividing of the ends 136 of the rails is effected by another set of plunger and cylinder assemblies 151 having contoured pads 154 at the outer ends of the extensible and retractable plungers 153 thereof. The pads 154 contact the outer base flanges 97 of the rails being held by the plunger and cylinder assemblies 142 (FIGS. 1b and 8) of the rails which project beyond the edges 138 until fracture occurs at the notches 115, as illustrated in FIG. 8.

Rail fragments are carried by chutes 156 on each side of the holding and breaking station 120, from whence they are received and transported by another conveyor 160 to a suitable storage area.

The invention herein disclosed also contemplates a novel method of fragmenting or subdividing elongated, fracturable members, specifically railroad rails, by carrying out the steps of advancing the rails along a path and sequentially righting tipped over rails moving on the path, inserting oppositely arranged pairs of notches in the base flanges of the rails at predetermined intervals, holding at least a portion of the rail at one side of the notches, and bending another portion of the rail to be fragmented at the other side of the notches until the portion breaks off.

While only one embodiment of the invention has been herein illustrated and described, it will be understood that modifications and variations thereof may be developed which do not depart from the spirit of the invention and scope of the appended claims.

I claim:

1. Apparatus for fragmenting a rail having laterally outwardly extending base flanges, a wheel supporting head, and a web connecting said base flanges and said head, said apparatus comprising support means adapted to support said rail in an upright position so that the base flanges extend substantially horizontally, a pair of chisel members adapted to move in a plane extending generally transversely to said rail and into engagement with the laterally outer side edges of the base flanges of said rail with sufficient force to insert a pair of laterally oppositely arranged notches in said flanges, the direction of movement of each of said chisel members being inclined at an angle of about 10 degrees above the horizontal when said rail is supported in said upright position by said support means during notching, holding means adapted to engage a portion of said rail at one side of said notches and to prevent movement of said rail, and breaking means adapted to engage another portion of said rail at the other side of said notches and to bend said other portion until it breaks off.

2. The apparatus of claim 1, in which said notching means includes a pair of cylinders having extensible and retractable plungers entending therefrom, and said chisel members are mounted on the ends of said plungers.

3. The apparatus of claim 2, in which said cylinders are connected to a common source of fluid under pressure and are constructed and arranged so that the forces applied by said chisel members to a rail during notching are substantially equal.

4. Apparatus for fragmenting railroad rails comprising support means adapted to support a rail, notching means adapted to substantially simultaneously insert a pair of laterally oppositely arranged notches in said rail, an upstanding wall adapted to extend lengthwise and along one side of said rail, shiftable means adapted to engage a portion of said rail at one side of said notches and to shift said portion of said rail into engagement with said wall so as to prevent movement of said rail, and breaking means adapted to engage another portion of said rail at the other side of said notches and to bend said other portion until it breaks off.

5. The apparatus of claim 4, in which said shiftable means includes an extensible and retractable plunger.

6. The apparatus of claim 5, in which said rail has laterally outwardly extending base flanges, a wheel supporting head, and a web extending between said base flanges and said head, and the plunger of said shiftable means is adapted to engage the web of said portion of said rail.

7. The apparatus of claim 6, in which said support means is adapted to support said rail in an upright position during fragmentation with the base flanges extending substantially horizontally, and the direction of movement of the plunger of said shiftable means is substantially horizontal.

8. The apparatus of claim 6, in which said wall has an undercut portion adapted to engage and support the side edge of one of the base flanges of said rail when the side of the head of said rail is engaged with said wall.

9. The apparatus of claim 4, in which said rail has laterally outwardly extending base flanges, a wheel supporting head, and a web extending between said base flanges and said head, and said breaking means is adapted to engage one of the flanges of said other portion of said rail.

10. The apparatus of claim 9, in which said breaking means includes an extensible and retractable plunger adapted to move in a plane extending generally transversely to said rail.

11. The apparatus of claim 10, in which said support means is adapted to support said rail in an upright position during fragmentation with the base flanges extending substantially horizontally, and the direction of movement of the plunger of said breaking means is substantially horizontal.

12. The method of fragmenting a railroad rail having laterally outwardly extending base flanges, a wheel supporting head, and a web extending between said base flanges and said head, said method comprising the steps of transporting said rail along a path with said rail extending lengthwise of said path, substantially simultaneously inserting a pair of laterally oppositely arranged notches in the base flanges of said rail, stopping movement of said rail on said path so that the notches therein are in substantial transverse alignment with a breaking edge on a contoured support wall along one side of said path and so that another portion of said rail projects unsupported beyond said breaking edge, holding at least a portion of said rail at one side of said notches against said wall so that one side of said head and one of said base flanges concurrently contact said wall when said rail is stopped, and bending said other portion of said rail at the other side of said notches until said other portion breaks off.

13. The method of claim 12, including the additional step of rotating a tipped-over rail being transported on said path to an upright position before it is notched.

14. The method of claim 12, including the additional steps of providing a parallel pair of said paths, and sequentially notching, holding and bending portions of said rails at spaced locations along said paths.

* * * * *